US011477598B2

United States Patent
Laaksonen et al.

(10) Patent No.: US 11,477,598 B2
(45) Date of Patent: *Oct. 18, 2022

(54) APPARATUSES AND ASSOCIATED METHODS FOR SPATIAL PRESENTATION OF AUDIO

(71) Applicant: Nokia Technologies Oy, Espoo (FI)

(72) Inventors: Lasse Laaksonen, Tampere (FI); Arto Lehtiniemi, Lempäälä (FI); Antti Eronen, Tampere (FI); Jussi Leppänen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/252,770

(22) PCT Filed: Jun. 17, 2019

(86) PCT No.: PCT/EP2019/065852
§ 371 (c)(1),
(2) Date: Dec. 16, 2020

(87) PCT Pub. No.: WO2020/002022
PCT Pub. Date: Jan. 2, 2020

(65) Prior Publication Data
US 2021/0258711 A1 Aug. 19, 2021

(30) Foreign Application Priority Data
Jun. 26, 2018 (EP) .................................... 18179839

(51) Int. Cl.
*H04S 7/00* (2006.01)
*G10L 21/0364* (2013.01)
(Continued)

(52) U.S. Cl.
CPC .......... *H04S 7/303* (2013.01); *G10L 21/0364* (2013.01); *H04S 2400/11* (2013.01); *H04S 2400/15* (2013.01); *H04S 2420/01* (2013.01)

(58) Field of Classification Search
None
See application file for complete search history.

(56) References Cited

U.S. PATENT DOCUMENTS

2010/0316232 A1* 12/2010 Acero ................... H04M 3/568
 381/92
2011/0010627 A1 1/2011 Donaldson et al.
(Continued)

FOREIGN PATENT DOCUMENTS

| EP | 2891955 A1 | 7/2015 |
| EP | 3232689 A1 | 10/2017 |
| EP | 3239981 A1 | 11/2017 |

OTHER PUBLICATIONS

Extended European Search Report received for corresponding European Patent Application No. 18179839.8, dated Dec. 5, 2018, 5 pages.
(Continued)

*Primary Examiner* — Qin Zhu
(74) *Attorney, Agent, or Firm* — Harrington & Smith

(57) ABSTRACT

An apparatus, the apparatus comprising means configured to: receive audio content comprising voice audio and ambient audio and directional information indicative of a direction of the at least one sound source and the direction of the remote user relative to the reference point; receive a reference location; provide for presentation of the ambient audio with a first spatial audio effect, based on the directional information, and presentation of the voice audio with a second spatial audio effect, based on the directional information, receive repositioning signalling from the remote user device; and provide for presentation of the audio
(Continued)

content using a modification of the first spatial audio effect to reposition an ambient-perceived direction based on the repositioning signalling and/or a modification of the second spatial audio effect to reposition a voice-perceived direction based on the repositioning signalling to increase the spatial separation between the voice-perceived direction and the ambient-perceived direction.

20 Claims, 8 Drawing Sheets

(51) Int. Cl.
   *H04R 3/00* (2006.01)
   *H04M 3/56* (2006.01)

(56) References Cited

U.S. PATENT DOCUMENTS

| | | | |
|---|---|---|---|
| 2012/0069986 A1* | 3/2012 | Edholm | H04M 3/2281 379/265.06 |
| 2012/0114130 A1 | 5/2012 | Lovitt | |
| 2013/0028443 A1* | 1/2013 | Pance | H04S 7/305 381/107 |
| 2013/0094653 A1* | 4/2013 | Bathurst | H04L 12/1827 381/17 |
| 2014/0136203 A1* | 5/2014 | Liu | G06F 3/167 704/246 |
| 2014/0247945 A1 | 9/2014 | Ramo et al. | |
| 2015/0078581 A1 | 3/2015 | Etter et al. | |
| 2016/0066091 A1* | 3/2016 | Kum | H04R 3/005 381/92 |
| 2017/0249939 A1* | 8/2017 | Brooks | G10L 15/24 |
| 2020/0137509 A1* | 4/2020 | Stanek | H04R 1/403 |
| 2020/0382747 A1* | 12/2020 | Prins | G06F 3/012 |
| 2021/0235189 A1* | 7/2021 | Secall | H04R 25/554 |

OTHER PUBLICATIONS

International Search Report and Written Opinion received for corresponding Patent Cooperation Treaty Application No. PCT/EP2019/065852, dated Jul. 24, 2019, 14 pages.

Office action received for corresponding Korean Patent Application No. 2021-7002373, dated Sep. 20, 2021, 3 pages of office action and no page of translation available.

Office action received for corresponding Indian Patent Application No. 202147001649, dated Jan. 5, 2022, 6 pages.

* cited by examiner

APPARATUSES AND ASSOCIATED METHODS FOR SPATIAL PRESENTATION OF AUDIO

RELATED APPLICATION

This application claims priority to PCT Application No. PCT/EP2019/065852, filed on Jun. 17, 2019, which claims priority to EP Application No. 18179839.8, filed on Jun. 26, 2018, each of which is incorporated herein by reference in its entirety.

The present disclosure relates to the field of presentation of audio content and, in particular, to the presentation of telecommunication audio content, such as spatial audio telecommunication audio. The present disclosure also relates to associated apparatus, methods and computer programs.

BACKGROUND

Telecommunication or telephony systems are being developed that provide for more than monophonic capture and presentation of audio. The audio of such telephony may comprise spatial audio. The presentation of such audio may require careful consideration to ensure the telecommunication is clear and effective.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In an aspect of the disclosure there is provided an apparatus, the apparatus comprising means configured to:
  receive audio content comprising voice audio comprising a voice of a remote user of a remote user device and ambient audio comprising audio from at least one sound source other than the remote user, wherein the audio content is associated with directional information indicative of one of a direction and a position of the at least one sound source relative to a reference point and indicative of one of the direction and the position of the remote user relative to the reference point;
  receive first information indicative of a reference location;
  provide for presentation of the ambient audio with a first spatial audio effect, based on the directional information, such that the audio of the at least one sound source is to be perceived as originating from an ambient-perceived direction relative to the reference location and
  provide for presentation of the voice audio with a second spatial audio effect, based on the directional information, such that the voice audio is to be perceived as originating from a voice-perceived direction relative to the reference location;
  receive repositioning signalling from the remote user device, the repositioning signalling indicative of an input to change the presentation of the audio content received from the remote user device; and
  provide for presentation of the audio content using at least one of a modification of the first spatial audio effect to reposition the ambient-perceived direction relative to the reference location based on the repositioning signalling and a modification of the second spatial audio effect to reposition the voice-perceived direction relative to the reference location based on the repositioning signalling to increase the spatial separation between the voice-perceived direction and the ambient-perceived direction.

In one or more examples, the reference location is indicative of the location of a user to which the audio content is to be presented.

In one or more examples, the repositioning signalling is indicative of where to reposition the at least one of the ambient-perceived direction and the voice-perceived direction and the means are configured to provide for presentation of the audio content with a modification of a respective at least one of the first spatial audio effect for the ambient audio and the second spatial audio effect for the voice audio so that at least one of said ambient audio and said voice audio is to be perceived from a new direction indicated by the repositioning signalling.

In one or more examples, the means are configured to:
  receive user input indicative of the repositioning of the perceived location of the presented audio content,
  present the audio content with one of modification of the first spatial audio effect to reposition the ambient-perceived direction as indicated by the user input and modification of the second spatial audio effect to reposition the voice-perceived direction as indicated by the user input.

In one or more examples, the means are configured to send, to the remote user device:
  user-audio content for presentation to the remote user, the user-audio content comprising user-voice audio comprising audio determined to be generated by a voice of a user, and user-ambient audio comprising audio from at least one sound source other than the voice, wherein the user-audio content includes directional information indicative of one of the direction towards and position of the at least one sound source relative to a user-reference point and indicative of one of the direction towards and position of the user relative to the user-reference point; and
  user-repositioning signalling instructing the remote user device to present one of the user-voice audio and user-ambient-audio such that it is perceived from a direction indicated at least in part by the user-repositioning signalling wherein the other of the user-voice audio and user-ambient-audio is for presentation as indicated by the directional information of the user-audio content.

In one or more examples, the presentation of the other of the user-voice audio and user-ambient-audio is based on the directional information and is independent of the user-repositioning signalling.

In one or more examples, the means are configured to:
  receive a predetermined type of user input; and
  send said user-repositioning signalling if the predetermined type of user input is received at a time it is determined that the user is talking; and
  provide for presentation of the audio content with at least one of a modification of the first spatial audio effect to reposition the ambient-perceived direction and a modification of the second spatial audio effect to reposition the voice-perceived direction if said predetermined type of user input is received at a time it is determined that the remote user is talking.

In one or more examples, said repositioning signalling is based on user input of the remote user.

In one or more examples, one of modification of the first spatial audio effect to reposition the ambient-perceived direction based on the repositioning signalling and modification of the first spatial audio effect to reposition the voice-perceived direction based on the repositioning signalling comprises performing a rotation, about the reference location, of said one of the ambient-perceived direction and the voice-perceived direction.

In one or more examples, the directional information of the audio content is indicative of the direction towards the at least one sound source and the direction towards the remote user relative to the remote user device, and the presentation of the ambient audio with the first spatial audio effect comprises presentation of the ambient audio as spatial audio to be perceived, from the reference location, as originating from the ambient-perceived direction that is based on the direction towards the at least one sound source relative to the remote user device defined in the directional information and the presentation of the voice audio with the second spatial audio effect comprises presentation of the voice audio as spatial audio to be perceived, from the reference location, as originating from the voice-perceived direction that is based on the direction towards the remote user relative to the remote user device defined in the directional information.

In one or more examples, said ambient-perceived direction is the direction from an ambient-perceived location to the reference location based on the position defined in the directional information, the ambient-perceived location comprising a location used by the first spatial audio effect for presentation of the ambient audio such that the user will perceive the ambient audio as originating from the ambient-perceived location; and said voice-perceived direction is the direction from a voice-perceived location to the reference location based on the position defined in the directional information, the voice-perceived location comprising a location used by the second spatial audio effect for presentation of the voice audio such that the user will perceive the voice audio as originating from the voice-perceived location; and wherein said one of modification of the first spatial audio effect and modification of the second spatial audio effect comprises repositioning a corresponding one of the ambient-perceived direction and the voice-perceived direction by a translation of a respective one of said ambient-perceived location and said voice-perceived location as indicated in the repositioning signalling.

In one or more examples, said directional information is indicative of the position of the at least one sound source relative to a space in which the remote user is located and is indicative of the position of the remote user relative to the space in which the remote user is located, and said ambient-perceived direction comprises an ambient-perceived location indicated in the directional information and comprises a location used by the first spatial audio effect to present the ambient audio to be perceived as originating from the ambient-perceived location, such that an arrangement of the at least one sound source in the space in which the remote user is located is recreated in a space in which the user is located, and said voice-perceived direction comprises a voice-perceived location indicated in the directional information and comprises a location used by the second spatial audio effect to present the voice audio to be perceived as originating from the voice-perceived location, such that the location of the remote user in the space in which the remote user is located is recreated in a space in which the user is located.

In an aspect of the disclosure there is provided an apparatus, the apparatus comprising means configured to:

send, to a remote user device, user-audio content for presentation by the remote user device, the user-audio content comprising user-voice audio comprising audio of a voice of a user, and user-ambient audio comprising audio from at least one sound source other than the user, wherein the user-audio content includes directional information indicative of the direction towards or the position of the at least one sound source relative to a user-reference point and the user relative to the user-reference point;

receive user input; and send user-repositioning signalling determined from said user input, to the remote user device, the user-positioning signalling indicative that one of the user-voice audio and user-ambient-audio should be presented by the remote user device to be perceived from a direction based on the user-repositioning signalling wherein the other of the user-voice audio and user-ambient-audio should be presented based on the directional information of the user-audio content.

In one or more examples, said sending of the user-repositioning signalling is provided based on said user input being received at a time it is determined that the user is talking.

In a further aspect there is provided a method, the method comprising:

receiving audio content comprising voice audio comprising a voice of a remote user of a remote user device and ambient audio comprising audio from at least one sound source other than the remote user, wherein the audio content is associated with directional information indicative of one of a direction and a position of the at least one sound source relative to a reference point and indicative of one of the direction and the position of the remote user relative to the reference point;

receiving first information indicative of a reference location;

providing for presentation of the ambient audio with a first spatial audio effect, based on the directional information, such that the audio of the at least one sound source is to be perceived as originating from an ambient-perceived direction relative to the reference location, providing for presentation of the voice audio with a second spatial audio effect, based on the directional information, such that the voice audio is to be perceived as originating from a voice-perceived direction relative to the reference location;

receiving repositioning signalling from the remote user device, the repositioning signalling indicative of an input to change the presentation of the audio content received from the remote user device; and providing for presentation of the audio content using at least one of a modification of the first spatial audio effect to reposition the ambient-perceived direction relative to the reference location based on the repositioning signalling and a modification of the second spatial audio effect to reposition the voice-perceived direction relative to the reference location based on the repositioning signalling to increase the spatial separation between the voice-perceived direction and the ambient-perceived direction.

In a further aspect there is provided a method, the method comprising:

sending, to a remote user device, user-audio content for presentation by the remote user device, the user-audio content comprising user-voice audio comprising audio of a voice of a user, and user-ambient audio comprising audio from at least one sound source other than the user, wherein the user-audio content includes directional information indicative of the direction towards or the position of the at least one sound source relative to a user-reference point and the user relative to the user-reference point;

receiving user input; and sending user-repositioning signalling determined from said user input, to the remote user device, the user-positioning signalling indicative that one of the user-voice audio and user-ambient-audio should be presented by the remote user device to be perceived from a direction based on the user-repositioning signalling wherein the other of the user-voice audio and user-ambient-audio should be presented based on the directional information of the user-audio content.

In a further aspect there is provided a computer readable medium comprising computer program code stored thereon, the computer readable medium and computer program code being configured to, when run on at least one processor, perform the method of:

receiving audio content comprising voice audio comprising a voice of a remote user of a remote user device and ambient audio comprising audio from at least one sound source other than the remote user, wherein the audio content is associated with directional information indicative of one of a direction and a position of the at least one sound source relative to a reference point and indicative of one of the direction and the position of the remote user relative to the reference point;

receiving first information indicative of a reference location;

providing for presentation of the ambient audio with a first spatial audio effect, based on the directional information, such that the audio of the at least one sound source is to be perceived as originating from an ambient-perceived direction relative to the reference location, providing for presentation of the voice audio with a second spatial audio effect, based on the directional information, such that the voice audio is to be perceived as originating from a voice-perceived direction relative to the reference location;

receiving repositioning signalling from the remote user device, the repositioning signalling indicative of an input to change the presentation of the audio content received from the remote user device; and providing for presentation of the audio content using at least one of a modification of the first spatial audio effect to reposition the ambient-perceived direction relative to the reference location based on the repositioning signalling and a modification of the second spatial audio effect to reposition the voice-perceived direction relative to the reference location based on the repositioning signalling to increase the spatial separation between the voice-perceived direction and the ambient-perceived direction.

In a further aspect there is provided a computer readable medium comprising computer program code stored thereon, the computer readable medium and computer program code being configured to, when run on at least one processor, perform the method of:

sending, to a remote user device, user-audio content for presentation by the remote user device, the user-audio content comprising user-voice audio comprising audio of a voice of a user, and user-ambient audio comprising audio from at least one sound source other than the user, wherein the user-audio content includes directional information indicative of the direction towards or the position of the at least one sound source relative to a user-reference point and the user relative to the user-reference point;

receiving user input; and sending user-repositioning signalling determined from said user input, to the remote user device, the user-positioning signalling indicative that one of the user-voice audio and user-ambient-audio should be presented by the remote user device to be perceived from a direction based on the user-repositioning signalling wherein the other of the user-voice audio and user-ambient-audio should be presented based on the directional information of the user-audio content.

In a further example aspect there is provided an apparatus comprising:

at least one processor; and at least one memory including computer program code, the at least one memory and the computer program code configured to, with the at least one processor, cause the apparatus to perform at least the following:

receive audio content comprising voice audio comprising a voice of a remote user of a remote user device and ambient audio comprising audio from at least one sound source other than the remote user, wherein the audio content is associated with directional information indicative of one of a direction and a position of the at least one sound source relative to a reference point and indicative of one of the direction and the position of the remote user relative to the reference point;

receive first information indicative of a reference location;

provide for presentation of the ambient audio with a first spatial audio effect, based on the directional information, such that the audio of the at least one sound source is to be perceived as originating from an ambient-perceived direction relative to the reference location and provide for presentation of the voice audio with a second spatial audio effect, based on the directional information, such that the voice audio is to be perceived as originating from a voice-perceived direction relative to the reference location;

receive repositioning signalling from the remote user device, the repositioning signalling indicative of an input to change the presentation of the audio content received from the remote user device; and provide for presentation of the audio content using at least one of a modification of the first spatial audio effect to reposition the ambient-perceived direction relative to the reference location based on the repositioning signalling and a modification of the second spatial audio effect to reposition the voice-perceived direction relative to the reference location based on the repositioning signalling to increase the spatial separation between the voice-perceived direction and the ambient-perceived direction.

In a further example aspect there is provided an apparatus comprising:

at least one processor; and at least one memory including computer program code, the at least one memory and the computer program code configured to, with the at least one processor, cause the apparatus to perform at least the following:

send, to a remote user device, user-audio content for presentation by the remote user device, the user-audio content comprising user-voice audio comprising audio of a voice of a user, and user-ambient audio comprising audio from at least one sound source other than the user, wherein the user-audio content includes directional information indicative of the direction towards or the position of the at least one sound source relative to a user-reference point and the user relative to the user-reference point;

receive user input; and send user-repositioning signalling determined from said user input, to the remote user device, the user-positioning signalling indicative that one of the user-voice audio and user-ambient-audio should be presented by the remote user device to be perceived from a direction based on the user-repositioning signalling wherein the other of the user-voice audio and user-ambient-audio should be presented based on the directional information of the user-audio content.

The present disclosure includes one or more corresponding aspects, examples or features in isolation or in various combinations whether or not specifically stated (including claimed) in that combination or in isolation. Corresponding means and corresponding functional units (e.g., function enabler, speaker selector, amplifier, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Figure 1:
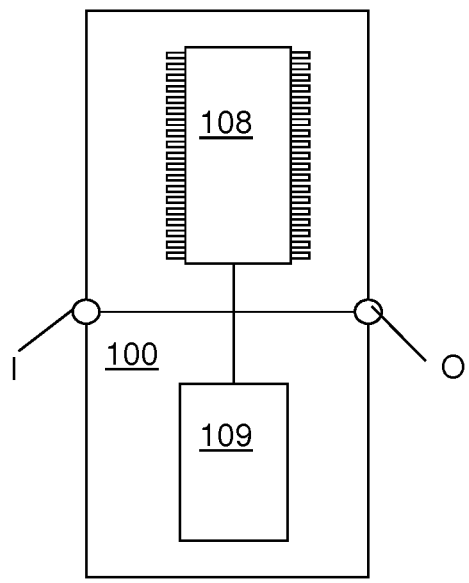
FIG. 1 illustrates an example apparatus for providing for presentation of audio.

Telecommunication or telephony systems are being developed that provide for more than monophonic capture and monophonic presentation of audio. Immersive telephony systems are being developed, such as by the 3rd Generation Partnership Project (3GPP), that will enable a new level of immersion in telephony services. Immersive telephony may comprise the use of spatial audio presentation techniques and the capture of spatial audio content in the provision of telecommunication between users. Such service can be realized, e.g., over a mobile 4G or 5G network by a multi-microphone spatial audio capture and processing, encoding in a suitable immersive audio format, transmission and decoding, and binaural or loudspeaker presentation. Such systems may provide for transmission of and presentation of immersive, spatial audio content, such as parametric spatial audio. This may enable receiving and sending of an enveloping audio scene from/to the telecommunication call participants or users. Thus, for example, when a remote user calls a user, the user can experience the audio environment around the remote user as if he/she was physically located at the location of the remote user and vice versa. Telecommunication between users may be provided by conventional telecommunication networks, mobile telecommunication networks, internet-based networks, peer-to-peer based networks or by any other network type.

In one or more examples, the audio content provided as part of said telecommunication may be categorised as primary "voice" audio and secondary "ambient" audio. The primary voice audio may comprise the important audio for understanding the telecommunication call while the secondary audio may comprise ambient audio, which may comprise sound from other sound sources or noise.

In one or more examples, the primary audio may comprise voice audio comprising audio determined to be generated by a voice of one or more remote users in telecommunication with a user (who may be referred to as a local user). The "voice" primary audio may be categorised at the point of capture or at the point of play back using audio analysis techniques, or by a server or any other entity involved in said telecommunication. The secondary audio may, in one or more examples, comprise ambient audio comprising audio other than that determined to be generated by the voice of one or more remote users. Thus, in one or more examples, a first microphone configured to detect the user's voice may provide the primary audio and one or more other microphones configured to detect audio from elsewhere may provide the secondary audio. It will be appreciated that with multi-microphone arrangements the same audio may be detected by more than one microphone and therefore audio processing techniques may be used to separate the voice audio detected primarily by the first microphone from the audio detected by the other microphones. For example, if a mobile telephone is used to capture the audio, a microphone near the user's mouth may be configured to capture, primarily, the voice audio and a microphone(s) on the back of the mobile telephone may be configured to capture the ambient audio. In one or more examples, a single microphone may be used and audio processing algorithms may be used to separate the voice audio from any ambient noise to provide for categorization of audio content as primary audio and secondary audio, wherein such algorithms are known to those skilled in the art.

In one or more examples, the primary voice audio may comprise spatial audio content that includes directional information for presentation such that it is perceived as originating from one or more directions in accordance with the directional information. In one or more examples, the secondary audio may comprise spatial audio content that includes directional information for presentation such that it is perceived as originating from one or more directions in accordance with the directional information. It will be appreciated that the ambient audio may comprise audio from a plurality of distinct sound sources and each sound source may have a respective direction related to the direction of arrival of the audio or the location of the audio source, as encoded in the directional information. Thus, the directional information of the ambient audio may define the direction towards one sound source or the directions towards an arrangement of sound sources. In other examples, the ambient audio defines an audio scene comprising a combined three-dimensional representation of the audio generated by the surrounding sources of audio, such as by using ambisonic recording techniques.

It will be appreciated that in one or more examples, the primary voice audio may be important for understanding a telecommunication call while the secondary, ambient, audio, may be considered to be the background audio at the location of the remote user. The secondary audio, by default, may be configured for spatial audio presentation. Thus, the secondary audio may be configured, by default, to be provided for replicating the ambient audio environment of the remote user to the user or vice versa.

With primary audio that comprises spatial audio content, the direction from which audio was received at the location of the remote user may be reproduced when presenting the audio to the first user (or any other user) by use of spatial audio presentation. In one or more examples, the primary audio may be converted to monophonic audio (such as from spatial audio content) and presented using spatial audio presentation such that it is perceived from a desired direction or location.

Spatial audio comprises audio presented in such a way to a user that it is perceived to originate from a particular location or direction, as if the source of the audio was located at that particular location or direction. Spatial audio content comprises audio for presentation as spatial audio and, as such, typically comprises audio having directional information (either explicitly specified as, for example, metadata or inherently present in the way the audio is captured), such that the spatial audio content can be presented such that its component audio is perceived to originate from one or more points or one or more directions in accordance with the directional information. One way to encode and deliver spatial audio for an immersive audio telecommunication call is to encode the user's voice and the spatial ambience separately. Various encoding formats exist including, e.g., near-far stereo, First Order Ambisonics (FOA)/Higher Order Ambisonic (HOA) (+objects), and other spatial audio encoding schemes.

In one or more examples, non-spatial audio content may be presented as spatial audio. Thus, "conventional" monophonic or stereophonic audio (or audio converted to such a format) may be provided for presentation such that it will be perceived to originate from a particular location or direction. One or more of the embodiments described herein may present spatial audio based on spatial audio content or non-spatial audio content.

The spatial positioning of the spatial audio may be provided by spatial audio effects applied to the audio content. The spatial audio effect includes 3D audio effects, such as those that utilise a head related transfer function to create a spatial audio space (aligned with a real-world space in the case of augmented reality) in which audio can be positioned for presentation to a user. Spatial audio may be presented by headphones by using head-related-transfer-function (HRTF) filtering techniques or, for loudspeakers, by using vector-base-amplitude panning techniques to position the perceived aural origin of the audio content. In other embodiments ambisonic audio presentation may be used to present spatial audio.

Spatial audio effects may use one or more of volume differences, timing differences and pitch differences between audible presentation to each of a user's ears to create the perception that the origin of the audio is at a particular location or in a particular direction in space. The perceived distance to the perceived origin of the audio may be rendered by controlling the amount of reverberation and gain to indicate closeness or distance from the perceived source of the spatial audio. It will be appreciated that spatial audio presentation as described herein may relate to the presentation of audio with only a perceived direction towards its origin as well as the presentation of audio such that the origin of the audio has a perceived location, e.g. including a perception of distance from the user.

Figure 2:
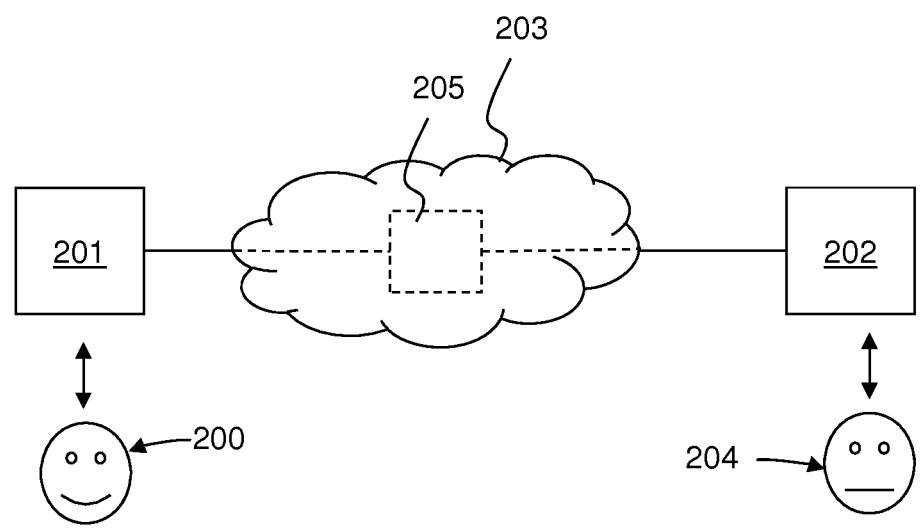
FIG. 2 illustrates telecommunication between a user and a remote user.

Example FIG. 1 and example FIG. 2 shows an apparatus 100 that may be used to control or provide for the presentation of, or present audio content to a user 200 and, optionally, to a remote user 204. The apparatus 100 may have application in the field of telecommunication and therefore in the examples that follow, the audio content is referred to as telecommunication audio content. However, it will be appreciated that reference to telecommunication infers no limitation on how the audio content is delivered and may be delivered via traditional telephone networks, mobile or cell-phone based networks, data networks such as the Internet using voice over IP or any telephony service whether packet based or circuit switched. The apparatus 100 may include means to receive telecommunication audio content or information about the receipt of telecommunication audio content by another apparatus, such as an input I. It will be appreciated that the apparatus 100 may include further inputs, such as to receive other information. The input I may receive telecommunication audio content, such as immersive, spatial audio content comprising voice audio and ambient audio, from a remote user device 202 (shown in FIG. 2). In one or more examples, the apparatus 100 may comprise part of a local user device 201 which may have the capability to provide for telecommunication with the remote user device 202, via a telecommunication network 203, which may comprise a traditional telephone network, cellular telephone network or the Internet. The local user device 201 and/or remote user device 202 may comprise mobile telephones or any other telecommunication equipment. Thus, the first user 200 may be able to communicate with a remote user 204 associated with the remote user device 202 via their local user device 201.

While the description that follows primarily describes the apparatus 100 as part of the local user device 201, it will be appreciated that a corresponding remote apparatus (not shown but equivalent to apparatus 100) may be provided as part of the remote user device 202 and may perform equivalent functions based on received telecommunication audio content and signalling received from the local user device that is remote thereto.

The apparatus 100 may comprise or be connected to a processor 108 and a memory 109 and may be configured to execute computer program code. The apparatus 100 may have only one processor 108 and one memory 109 but it will be appreciated that other embodiments may utilise more than one processor and/or more than one memory (e.g. same or different processor/memory types). Further, the apparatus 100 may be an Application Specific Integrated Circuit (ASIC).

The processor may be a general purpose processor dedicated to executing/processing information received from other components, such as telecommunication audio content in accordance with instructions stored in the form of computer program code in the memory. The output signalling generated by such operations of the processor is provided onwards to further components, such as to speakers, headphones, an amplifier or other audio presentation equipment (not shown) to present the audio content to the user 200.

The memory 109 (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood, in one or more example embodiments, to provide an active coupling between the processor and the memory to allow the processor to access the computer program code stored on the memory.

In this example, the respective processors and memories are electrically connected to one another internally to allow for electrical communication between the respective components. In this example, the components are all located proximate to one another so as to be formed together as an ASIC, in other words, so as to be integrated together as a single chip/circuit that can be installed into an electronic device. In some examples one or more or all of the components may be located separately from one another.

Figure 3:
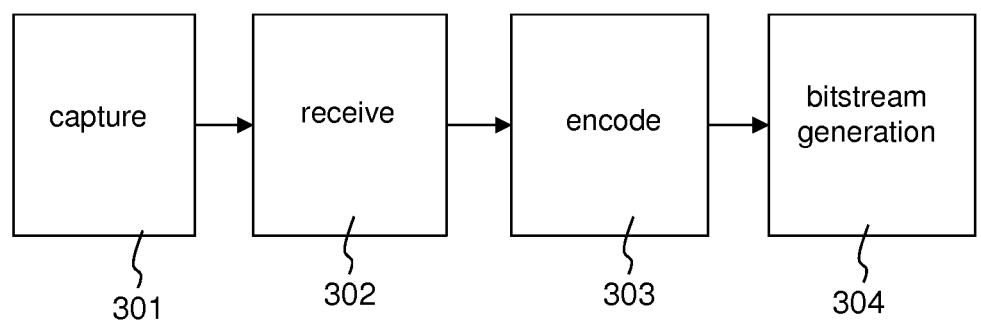
FIG. 3 illustrates an example block diagram of an immersive spatial audio encoder.

FIG. 3 shows an example block diagram of the capture and encoding of immersive audio content by an immersive audio encoder, which may form part of one or more of the remote user device 202, remote apparatus, apparatus 100 or local user device 201 for encoding the audio content. Capture block 301 illustrates the capture of audio by one or more microphones from one or more sources, such as from a mobile telephone, immersive video capture device, a computer or a smartphone. Receive block 302 illustrates the receiving of audio that may be captured in various formats, such as monophonically, as ambisonics audio, as multiple channels or streams, wherein said audio may, in one or more examples, be associated with metadata that may define at least the direction of arrival of the audio from the source or location of the source of audio. An encode block 303 receives the audio captured in its various formats. The encode block 303 may provide audio mixing. The metadata associated with the audio may be captured in a plurality of different formats. In one or more examples the block 303 may translate the metadata into a standard format. In one or more examples, the audio itself may be captured and encoded in different formats and the block 303 may transcode the audio to a standard format or formats. Bitstream generation block 304 provides for generation of a bitstream in an immersive audio encoded format.

The proliferation of high-quality spatial audio services, applications and devices capable of rendering the spatial audio content (e.g. head-tracked binaural audio) will likely lead to significant increase in their use. And vice versa, increased interest in immersive spatial audio content will lead to more and more offerings in the market.

Immersive, spatial audio content by definition aims to be immersive. A user 200 or remote user 204 may or may not take this into account when considering how the audio around them may be heard by the remote party. It may not always be possible or practical. For example, there may be a very dominant sound source in the space, such as a noisy dog barking, where audio capture is being made. The user 200 may at times be close to the dominant sound source and at other times very distant from it. This can affect, for example, how well the remote user 204 can understand the user 200 and the dominant sound source, which may be important for the immersive spatial audio call experience.

From the point of view of the remote user, the spatial audio presentation poses additional requirements. For example, the remote user may be in a noisy environment themselves or the remote user may be multitasking. The rendering of an immersive spatial audio telecommunication content requires careful consideration. In particular, when the user 200 or remote user 204 move within their space and around other sound sources, the way in which the telecommunication audio content is presented for the other party may be problematic.

Figure 4:
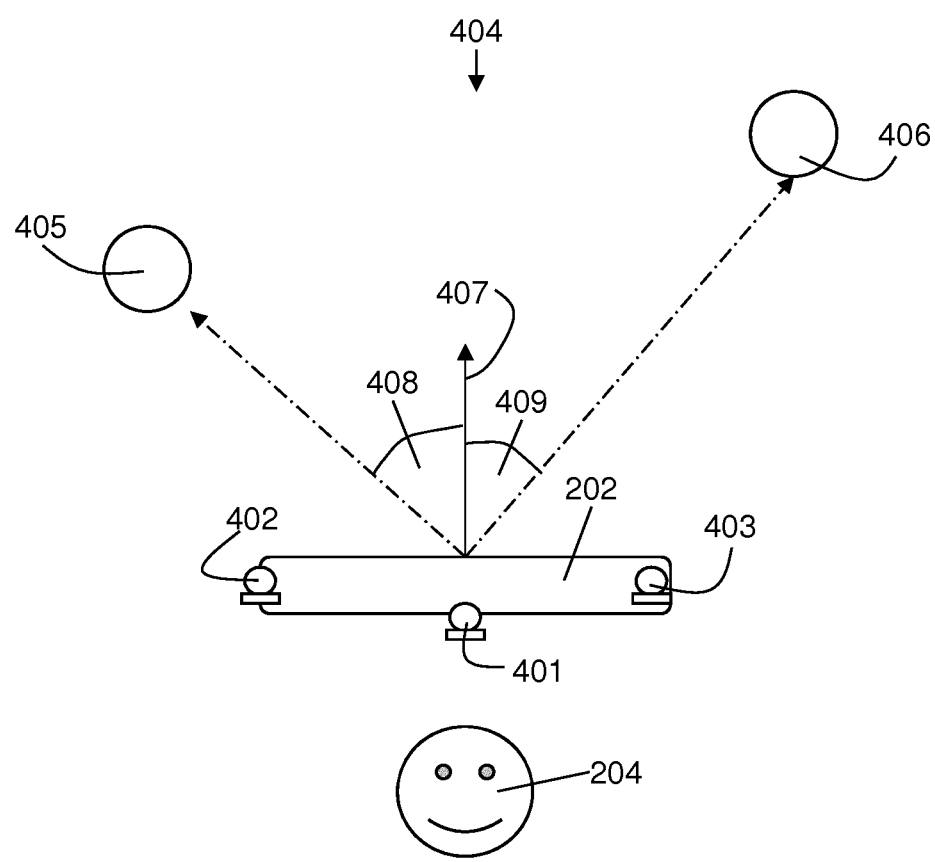
FIG. 4 illustrates the example capture of spatial audio content to provide as telecommunication audio content.

Example FIG. 4 shows the remote user 204 with their remote user device 202, which in this example comprises a mobile telephone. The remote user device 202 is configured to capture spatial audio content for use in telecommunication with the local user device 201 and thereby the user 200, termed telecommunication audio content.

In this example, the remote user device 202 incudes at least one microphone for capture of voice audio, such as microphone 401 located on a front of the remote user device 202. Accordingly, the microphone 401 may be the microphone best positioned to receive the voice of the remote user 204. Further, the remote user device 202 incudes at least one microphone for capture of ambient audio, such as second microphone 402 and third microphone 403, located on a rear of the remote user device 202 for capturing the audio from sound sources 405, 406 in a space 404 in which the remote user 204 is located.

In terms of sounds, the space 404 therefore includes the voice audio from the remote user 204 and ambient audio from a first sound source 405 and a second sound source 406. The ambient audio thus comprises audio from at least one sound source other than the remote user 204 and, in particular, the voice of the remote user 204. The voice audio captured by microphone 401 may include audio from the sound sources and, likewise, the ambient audio captured by the second and third microphones 402, 403 may include audio from the remote user's voice. However, audio processing may be performed to filter the voice audio and thereby remove audio from the sound sources 405, 406. Audio processing may be performed to filter the ambient audio and thereby remove audio from the voice of the remote user 204. The telecommunication audio content may therefore include a voice audio channel and one or more ambient audio channels containing information representative of the respective audio content.

The telecommunication audio content is associated with directional information indicative of one of the direction towards and position of the at least one sound source relative to a reference point. In this example, the reference point comprises a direction 407 extending from the remote user device 202 and pointing away from the remote user 204, such as in the direction they are facing with the remote user device held in front of them.

In this and one or more examples, the direction information for the first sound source 405 may comprise the direction towards it measured from the reference point, which may comprise angle 408—about −45°. The direction information for the second sound source 406 may comprise the direction towards it measured from the reference point 407, which may comprise angle 409—about +40°. The directional information associated with the voice audio may also comprise an angle, such as +180°. It will be appreciated that the directional information may be represented in other ways and in three-dimensional coordinates rather than as shown in this two-dimensional example. Thus, in one or more examples, an azimuth and altitude and, optionally, a distance may be specified. In other examples, 2-dimensional or 3-dimensional cartesian coordinates may be used. Regardless of the how the direction or position of the origin of the sounds are recorded, the directional information may represent the spatial relationship between the positions of the sources of audio including the voice audio in the space 404.

The use of two microphones 402, 403 may enable the direction towards the sound sources 405, 406 to be determined by virtue of timing differences in corresponding audio received at each of the microphones. In other examples, the location or directions towards the sound sources 405, 406 may be determined in other ways, such as my directional microphone arrays that are able to determine angle of arrival of audio. In one or more examples, the position of the audio sources may be determined optically by one or more cameras. In one or more other examples, the remote user device 202 may include a different number or arrangement of microphones.

Figure 5:
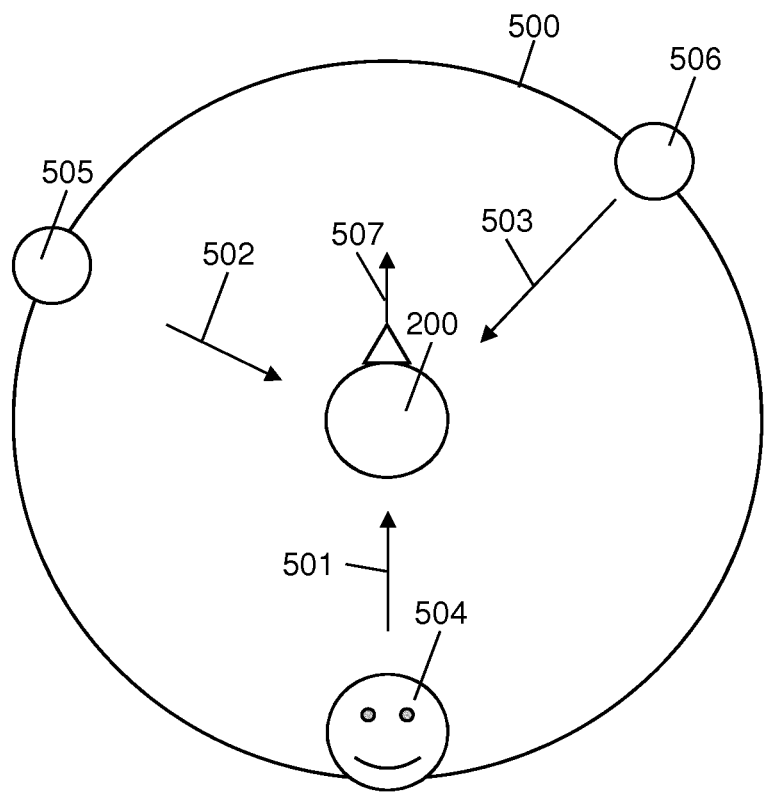
FIG. 5 illustrates an example of presentation of the telecommunication audio content including the directions from which the user perceives the audio as originating.

Example FIG. 5 shows an example of how the captured telecommunication audio content may be presented or "rendered" as spatial audio to the user 200 based on the directional information. The apparatus may be configured to receive first information, which may comprise a reference direction 507, such as the direction the user 200 is facing, and/or a location of the user 200. FIG. 5 shows the user 200 listening to the telecommunication audio content presented as spatial audio. In general, the user 200 will be using binaural headphones. It is generally understood that such headphone presentation is considered the preferred presentation method for most immersive, spatial audio use cases. However, it will be appreciated that loudspeaker arrangements may be used for presentation of spatial audio or presentation by a soundbar.

Example FIG. 5 shows the aural scene with which the user 200 is presented. It will be appreciated that spatial audio presentation provides the perception that the source of the audio is located in the space around the user 200 (the listener). A spatial audio effect can be applied to audio content which causes its presentation as spatial audio and thus such that the origin of the audio is perceived from a particular location or direction relative to the listener or user, when the apparatus 100 is in use. In this example, the directional information of the telecommunication audio content includes only a direction that references the direction towards the sound sources and voice audio (or equally the direction from which the audio is perceived to arrive). Accordingly, in one or more examples, the telecommunication audio content may be rendered as spatial audio from perceived locations that lie on a notional circle or sphere around the user 200, as shown by circle 500. In other examples, in which the directional information includes distance information, then the perceived locations may be rendered from locations located at different distances.

The scene shows a first representation 504 of the remote user 204 to represent where the user 200 perceives the voice audio of the remote user 204. As can be appreciated the voice audio is heard from a voice perceived-direction 501 of +180° (relative to the reference direction 507 of the first information), as represented in the directional information. The apparatus 100 may apply a spatial audio effect to the voice audio of the audio content such that it is presented to be perceived as originating from the voice perceived-direction. A second representation 505 represents the first sound source 405 and a third representation 506 represents the second sound source 406, which are perceived from the same directions as defined in the directional information associated therewith, namely a first ambient-perceived direction 502 and a second ambient-perceived direction 503 respectively. Thus, the apparatus 100 may apply a respective spatial audio effect to the "ambient" first sound source audio and the "ambient" second sound source audio such that it is presented with the respective first ambient-perceived direction and the second ambient-perceived direction. In this and one or more other examples, the ambient-perceived directions 502 and 503 and voice perceived-direction 501 directly correspond to the directions from which the audio was received by the remote user device 202. However, in other examples, the voice audio may be presented such that it is perceived from in front of the user 200.

The first sound source 405 (of FIG. 4) may move closer to the remote user 204 in the space 404. The first sound source 405 may comprise the remote user's pet dog, who happens to be making noise by barking. Thus, in example FIG. 6, which shows how the captured telecommunication audio content is presented to the user 200 (similar to FIG. 5), the second representation 505 of the remote sound source 405 is at a substantially common perceived location in the aural scene. The understanding of two different audio sources where the two sources of audio are heard from the same perceived direction is known to be difficult for the human brain. The problem can become worse during telecommunication network congestion, when allocated bitrate is lower and more coding artefacts are introduced. The perceived location of the second representation 505 and the voice audio 504 (and therefore the location of the remote user 204 and first sound source 405) may be said to be co-located. It will be appreciated that being co-located may comprise being within a threshold distance of one another or having an angular separation less than a threshold angular separation. The apparatus 100 may be configured to provide feedback to warn one of the user or remote user on such a basis.

In one or more examples, repositioning signalling may be received from the remote user device 202 based on remote user input from remote user 204. The repositioning signalling may comprise signalling that is notionally indicative of the repositioning described herein. The repositioning signalling may represent an instruction from the remote user 204 for the apparatus 100 to reposition the perceived location/direction of either the voice audio or the ambient audio from a position as indicated in the directional information. The repositioning signalling may be provided with the telecommunication audio content or may be provided separately therefrom, such as "out-of-band".

Figure 7:
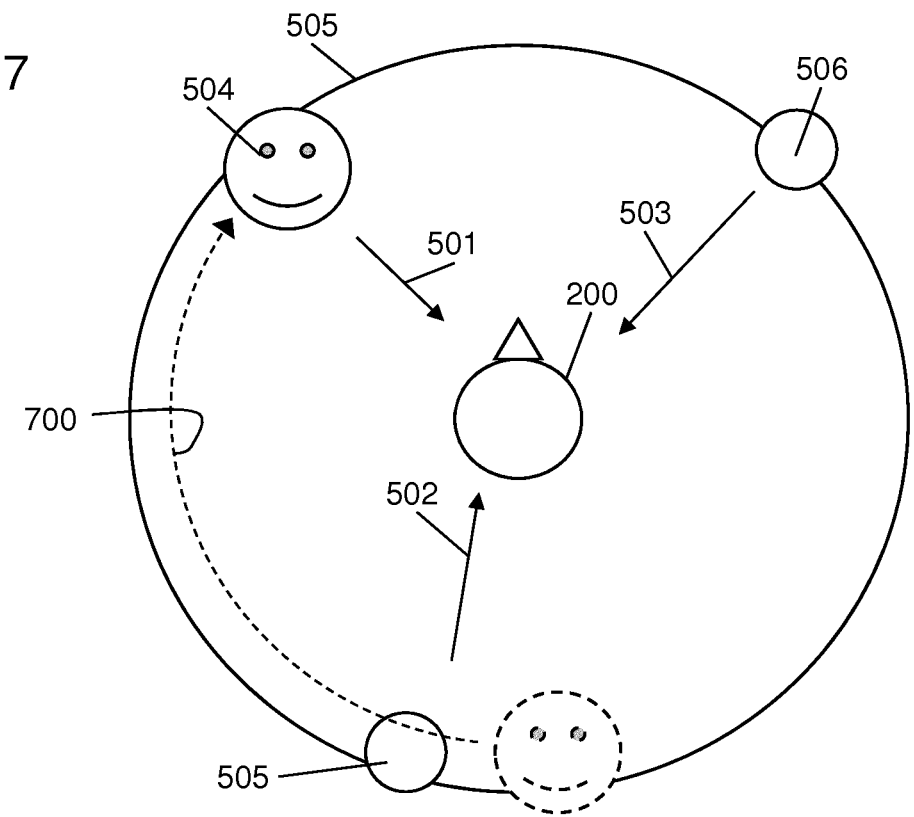
FIG. 7 illustrates an example effect of the repositioning signalling.

Example FIG. 7 shows the apparatus 100 having acted on the repositioning signalling and modified the spatial audio effect applied to the voice audio to reposition 700 the voice-perceived direction 501 of the first representation 504 of the voice audio. Thus, the apparatus 100 may therefore present the audio content using the modified spatial audio effect(s). Accordingly, the perceived direction 501 from which the user 200 will perceive the voice audio is now spaced from the perceived directions 502, 503 from which the user 200 will perceive the sound sources 505, 506 of the ambient audio. In one or more other examples, the ambient perceived direction 502 or both the ambient perceived directions 502, 503 may be repositioned. For example, the repositioning may be provided as a rotation of the relative arrangement of ambient sound sources, as if circle 500 was rotated taking both the second and third representations 505, 506 with it at their relative locations thereon.

Accordingly, to summarise, the apparatus 100 may be configured to receive, or receive information about the receipt of, telecommunication audio content from a remote user device 202 for presentation to a user 200. The telecommunication audio content may comprise voice audio comprising audio determined to be generated by a voice of the remote user 204 for telecommunication with the user 200, and ambient audio comprising audio from at least one sound source 405, 406 other than the remote user 204. The telecommunication audio content may comprise spatial audio content and therefore it is associated with directional information indicative of one of the direction towards and position of the sound sources 405, 406 relative to a reference point 407 and indicative of one of the direction towards and position of the remote user 204 relative to the reference point 407.

As shown in example FIG. 5, the ambient audio is provided for presentation as spatial audio, using a spatial audio effect, such that the user 200 will perceive the audio of the sound sources 405, 406 as originating from an ambient-perceived direction 502, 503 relative to the user 200 based on the directional information. The presentation of the ambient audio may be performed by the apparatus 100 or under the control of the apparatus 100 by a different device, such as the local user device 201. Further, the voice audio may be provided for presentation as spatial audio, using a spatial audio effect, such that the user 200 will perceive the voice audio as originating from a voice-perceived direction 501 relative to the user 200 based on the directional information. The presentation of the voice audio may be performed by the apparatus 100 or a different device, such as the local user device 201. It will be appreciated that the apparatus 100 may use a reference point or direction 507 relative to the user 200 to determine the voice-perceived direction 501 and ambient-perceived directions 502, 503, which in this example points forward from the user 200 but could be defined relative to the room the user 200 is in, the local user device 201 and/or point in a different direction.

The repositioning signalling received from the remote user device 201 may be based on receipt of input by the remote user 204. For example, the remote user may realise that the dog sound source 505 would cause problems for the user 200 when the spatial audio content is rendered and therefore they may provide input to cause the remote user device to send the repositioning signalling to cause a deviation from a default rendering of the telecommunication audio content that is based on the directional information.

The apparatus 100 may, in response to receipt of the repositioning signalling modify one of the "first" spatial audio effect to reposition the ambient-perceived direction based on the repositioning signalling and the "second" spatial audio effect to reposition 700 the voice-perceived direction based on the repositioning signalling. It will be appreciated that in order to remove any spatial overlap between the voice-perceived direction 501 and any one of the ambient-perceived directions 502, 503 (i.e. being co-located), either the ambient-perceived directions 502, 503 could be repositioned or the voice-perceived direction 501 could be repositioned. In some examples, both could be repositioned provided that they are not repositioned in the same way i.e. direction and magnitude of repositioning, otherwise there would be no improvement for the user 200. By said modification of the spatial audio effect(s) to reposition, the apparatus 100 provides for an increase in the spatial separation between the voice-perceived direction 501 and the ambient-perceived direction(s) 502. This may aid understanding of the voice audio without removing the ambient audio from presentation.

In one or more examples, while the apparatus 100 provides for repositioning of one of the voice-perceived direction 501 and the ambient-perceived direction(s) 502, 503 based on the repositioning signalling, the apparatus 100 may be configured to continue to determine the other of the ambient-perceived direction and the voice-perceived direction independently of the repositioning signalling, such as with reference to the directional information.

The repositioning signalling may, in one or more examples, comprise an instruction received from the remote user device 202, to cause the repositioning by the apparatus 100 to increase in the spatial separation between the voice-perceived direction 501 and the ambient-perceived direction(s) 502. Accordingly, the apparatus 100 may be configured to determine where to reposition the one of the voice-perceived direction 501 and the ambient-perceived direction(s) 502. In one or more examples, the apparatus 100 may be configured to determine a new direction for one of the voice-perceived direction 501 and the ambient-perceived direction(s) 502 that is not co-located with the other of the voice-perceived direction 501 and the ambient-perceived direction(s) 502.

In one or more examples, the remote user 200 may provide by their user input an indication of from which perceived direction/location they would like their voice audio rendered to the user 200 or alternatively, from which perceived direction/location they would like the ambient audio rendered to the user 200. Thus, the repositioning signalling may be indicative of where to reposition the one of the ambient-perceived direction and the voice-perceived direction. The apparatus 100 may be configured to, on receipt of the repositioning signalling, provide for presentation of one of the ambient audio and the voice audio with a modified spatial audio effect such that the user will perceive said audio from a new direction (e.g. 501 of FIG. 7 vs. 501 of FIG. 6) based on the repositioning signalling.

Figure 8:
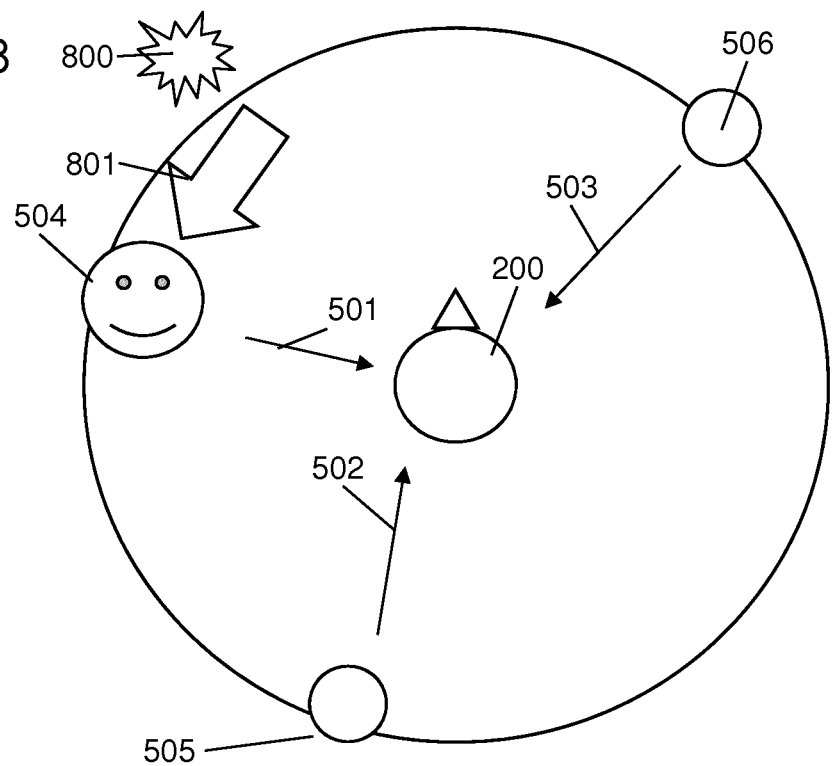
FIG. 8 illustrates an example of the user repositioning the directions from which they perceive the presentation of the spatial telecommunication audio content.

In one or more examples, the repositioning signalling, provided from the remote user 204 and acted on by the apparatus 100, may result in, for example, the voice audio being moved to a perceived direction 501 where there is a source of sound or noise at the location of or in the space of the user 200. Example FIG. 8 shows a noise source 800 that is physically located in the room with the user 200. Thus, the voice-perceived direction 501 would be co-located with a source of noise potentially making the voice audio difficult to understand. The apparatus 100 may be configured to reposition 801 the voice-perceived direction 501 based on user input from the user 200. Thus, the user 200 may be able to control the perceived directions from which they perceive the audio content (voice and/or ambient) as well as the remote user 204 using the repositioning signalling to provide such an effect.

In summary, in one or more examples, the apparatus 100 is configured to, based on user input for repositioning of the perceived location of the audio presented to them from the user 200, modify one of the spatial audio effect applied to the ambient audio to reposition the ambient-perceived direction 502, 503 based on the user input and the spatial audio effect applied to the voice audio to reposition 801 the voice-perceived direction 501 based on the user input. Thus, in the example of FIG. 8, the voice-perceived direction 501 has been moved away from the noise source 800, thereby allowing the user 200 to better understand the voice audio.

It will be appreciated that while the above describes the apparatus 100 receiving telecommunication audio content and repositioning signalling from the remote user device 202, the apparatus 100 may also have the capability to provide telecommunication audio content (termed "user-telecommunication audio content" for ease of understanding) and repositioning signalling (termed user-repositioning signalling for ease of understanding) to the remote user device 202. The remote user device 202 may include an apparatus (not shown) equivalent to the apparatus 100 for acting on said user-telecommunication audio content and user-repositioning signalling received from the local user device and/or apparatus 100.

Thus, the apparatus 100 may be configured to send, to the remote user device 202, user-telecommunication audio content for presentation to the remote user 204, the user-telecommunication audio content comprising user-voice audio comprising audio determined to be generated by a voice of the user 200 for telecommunication with the remote user 204, and user-ambient audio comprising audio from at least one sound source other than the user 200. The user-telecommunication audio content may include directional information indicative of one of the direction towards and position of the at least one sound source relative to a user-reference point (such as similar to reference direction 407) and one of the direction towards and position of the user 200 relative to the user-reference point.

Further, in one or more examples, the apparatus 100 may be configured to send, to the remote user device 202, user-repositioning signalling instructing the remote user device 202 to present one of the user-voice audio and user-ambient-audio such that it is perceived from a direction based at least in part on the user-repositioning signalling wherein the other of the user-voice audio and user-ambient-audio is for presentation based on the directional information of the user-telecommunication audio content. Thus, the user 200 may be able to control how the audio captured at their location is presented to the remote user 204 using the user-repositioning signalling, similar to how the remote user 204 may be able to control how the audio captured at their location is presented to the user 200 using the repositioning signalling.

The presentation of the non-repositioned one of the user-voice audio and user-ambient-audio may be based on the directional information and may be independent of the user-repositioning signalling.

The user input provided by the remote user 204 to provide the repositioning signalling and/or the user input provided by the user 200 to provide the user-repositioning signalling and/or the user input of user 200 to repositioning how the audio is presented to them (exemplified with reference to FIG. 8) may be comprise a rotation user input. The rotation input may be provided by a user gesture that rotates, such as a hand/wrist rotation, a rotational movement on a rotation wheel of a mouse, a rotation trace of a finger or stylus on a touch screen input device or any other rotation input. In one or more other examples, the user input may be any other type of user input, such as translational movement.

The repositioning of one of the voice-perceived direction 501 and the ambient-perceived direction(s) 502 may be provided by rotation of said one of the voice-perceived direction 501 and the ambient-perceived direction(s) 502 relative to a reference point or relative to the other of the voice-perceived direction 501 and the ambient-perceived direction(s) 502. With reference to FIG. 7, the repositioning provided for by the apparatus 100 is realised by the rotation 700 of the voice-perceived direction 501 around the user 200, which may also be interpreted as a rotation of the first representation 504 of the remote user 204 around circle 500. In one or more examples, the repositioning may be provided by a one or more of: rotation around multiple axes of rotation to provide 3-dimensional repositioning of the perceived direction(s); rotation around one axis of rotation to provide repositioning in a plane and repositioning by translation.

Figure 6:
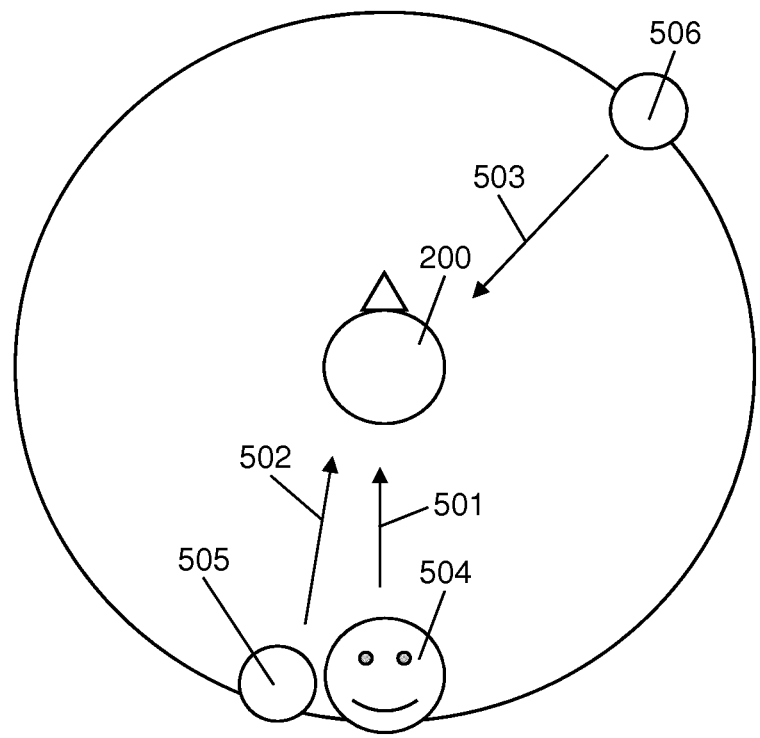
FIG. 6 illustrates an example of presentation of the telecommunication audio content including the directions from which the user perceives the audio as originating in which a sound source of the ambient audio is co-located with the voice audio.

In one or more examples, the apparatus 100 may provide for presentation of the voice audio from at least one intermediate direction between voice-perceived direction 501 shown in FIG. 6 to the new voice-perceived direction 501 shown in FIG. 7. Accordingly, the apparatus 100 may be configured to reposition, in an incremental and progressive manner, the voice-perceived direction 501 based on the repositioning signalling or user-input. This may help the user 200 to understand what is happening to the perceived direction/position of the voice of the remote user 204 or the perceived direction/position of the ambient sound sources 205, 206 if they can hear them progressively moving to their new positions/directions. A similar progressive presentation may be provided if the ambient-perceived direction is repositioned.

Figure 9:
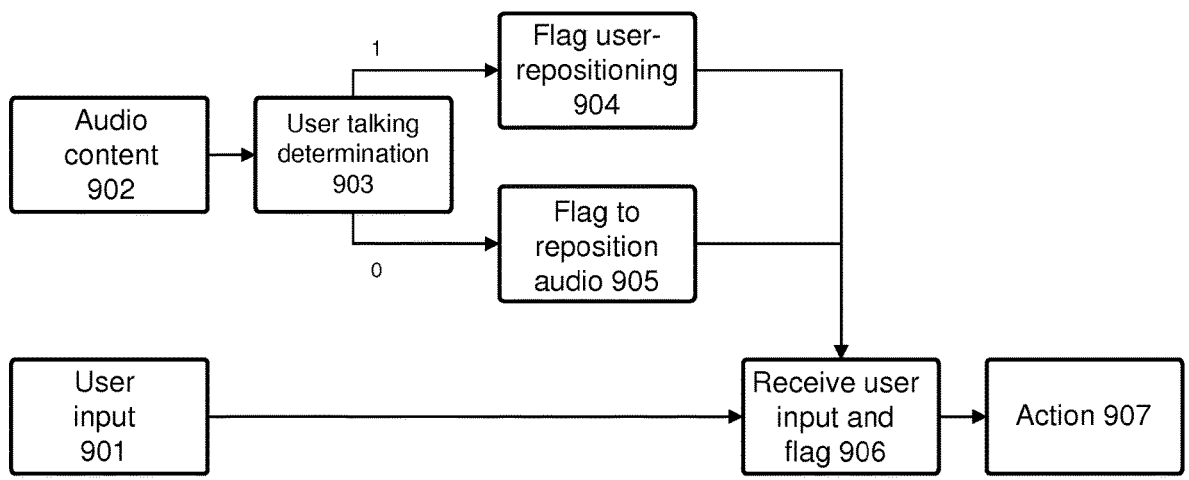
FIG. 9 illustrates an example block diagram showing the interpretation of user input to reposition the perceived locations/direction of the audio presented to the user or the audio presented to the remote user.

Example FIG. 9 shows a block diagram illustrating example means for interpreting user input for repositioning of the perceived audio directions/positions. The functionality shown in the block diagram may be part of the apparatus 100. In one or more examples, the same user input type be used for generation of the user-repositioning signalling for use by the remote user device 202 and the repositioning of the direction/location from which the user 200 hears the audio presented to them.

Block 901 shows the receipt of user input, such as rotation user input. Block 902 comprises a codec input block configured to handle the receipt and sending of the telecommunication audio content and the user-telecommunication audio content. Block 903 is configured to determine which of the user 200 or the remote user 204 is generating audio, e.g. talking, at any one time. Blocks 904, 905 set a flag that defines whether to apply the user input to generation of the user-repositioning signalling or for repositioning of the audio presented to the user 200. Block 906 thus receives the user input form block 901 and the flag from blocks 904, 905 and determines how to interpret the user input. Block 907 therefore either generates the user-repositioning signalling based on the user input from user 200 or provides for repositioning of the direction/location from which the user 200 hears the audio presented to them.

Thus, the apparatus 100 may be configured to provide said user-repositioning signalling based on a predetermined type of user input, such as a rotation input, being received at a time it is determined that the user 200 is generating audio. Thus, when the user 200 is talking and their audio will be presented to the remote user 204, the user input is used to control from where the remote user 204 perceives one of the user-voice audio and the user-ambient audio.

The apparatus 100 may be configured to reposition one of the ambient-perceived direction and the voice-perceived direction based on said predetermined type of user input, such as rotation input, being received at a time it is determined that the remote user 204 is generating audio. It will be appreciated that the repositioning of the above-mentioned directions herein is provided by modification of parameters of the spatial audio effects applied to the audio content for presentation.

In the above-mentioned examples, the apparatus 100 is configured to present what is known as three degrees of freedom (3DOF) augmented reality, in which the user 200 is presented with the audio scene arranged relative to them. Accordingly, they can move their head about three axes of rotation but the audio scene is presented such that it is centred on them. Thus, in one or more examples, the remote user device 202 may capture the direction towards objects from a single reference point 407 and the apparatus 100 may present the captured audio as a 3DOF space around the user 200.

In one or more examples, the directional information of the telecommunication audio content is indicative of the direction towards the at least one sound source and the direction towards the remote user relative to the end user device 202. The directional information may be indicative of direction and distance or just direction. In one or more examples, the presentation as spatial audio of the ambient audio comprises presentation such that said audio is to be perceived from the ambient-perceived direction that is determined relative to the user 200 based on the direction relative to the remote user device 202 defined in the directional information. Likewise, in one or more examples, the presentation as spatial audio of the voice audio may comprise presentation such that said audio is perceived from the voice-perceived direction that is determined relative to the user 200 based on the direction relative to the remote user device 202 defined in the directional information. In other examples, the voice-perceived direction may be repositioned, so that it points towards the user from a position in front of the user 200.

In one or more examples, the directional information defines the positions of the voice audio and the sound sources relative to a room, area or more generally, a space in which the remote user 204 (or user 200) is located. In this case, in one or more examples, the arrangement of the audio sources in the room or space of the remote user 204 can be recreated in the room or space of the user 200, rather than being centred on the user. This representation may be known as six degrees of freedom (6DOF) because the user 200 can additionally move about the space passed or between the perceived locations.

Thus, in one or more examples, said ambient-perceived direction mentioned above is based on an ambient-perceived location, which is based on the position defined in the directional information, the ambient-perceived location comprising a location used in the presentation of the ambient audio as spatial audio, using the spatial audio effect, to be perceived as originating from the ambient-perceived location. Further, said voice-perceived direction mentioned above is based on a voice-perceived location based on the position defined in the directional information, the voice-perceived location comprising a location used in the presentation of the voice audio as spatial audio, using the spatial audio effect, to be perceived as originating from the voice-perceived location.

Figure 10:
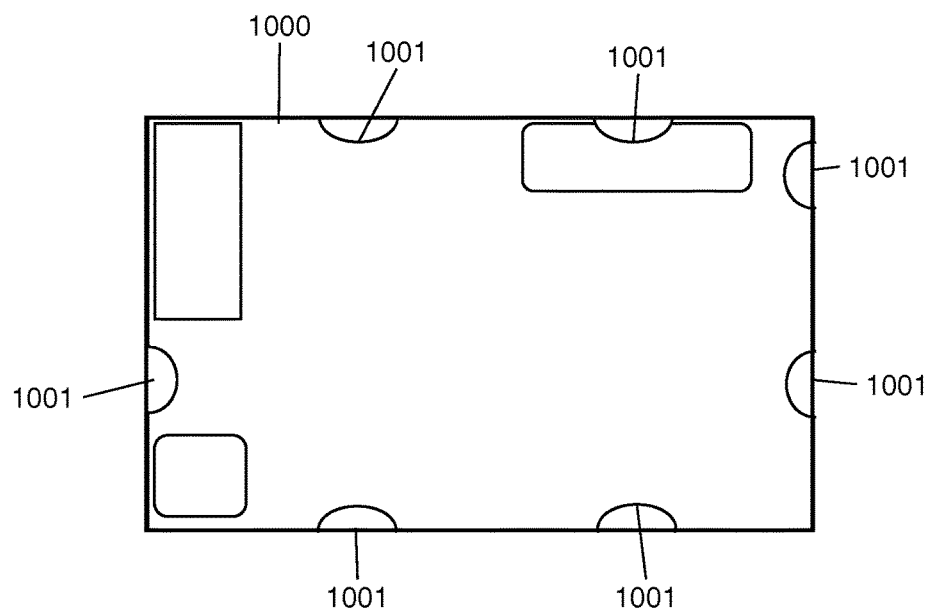
FIG. 10 illustrates an example room for capture of telecommunication audio content and directional information.

Example FIG. 10 shows a room or space 1000 of the remote user 204 including a plurality of microphones 1001 located at different locations. The audio captured by the microphones 1001 may be processed to determine where in the room 1000 each audio source is located based on, for example, timing difference between the receipt of the audio at different microphones. Such an arrangement may be used to capture directional information that defines the position of the each of the sound sources for determining the origin of the ambient audio and the remote user 204 for determining the origin of the voice audio.

Figure 11:
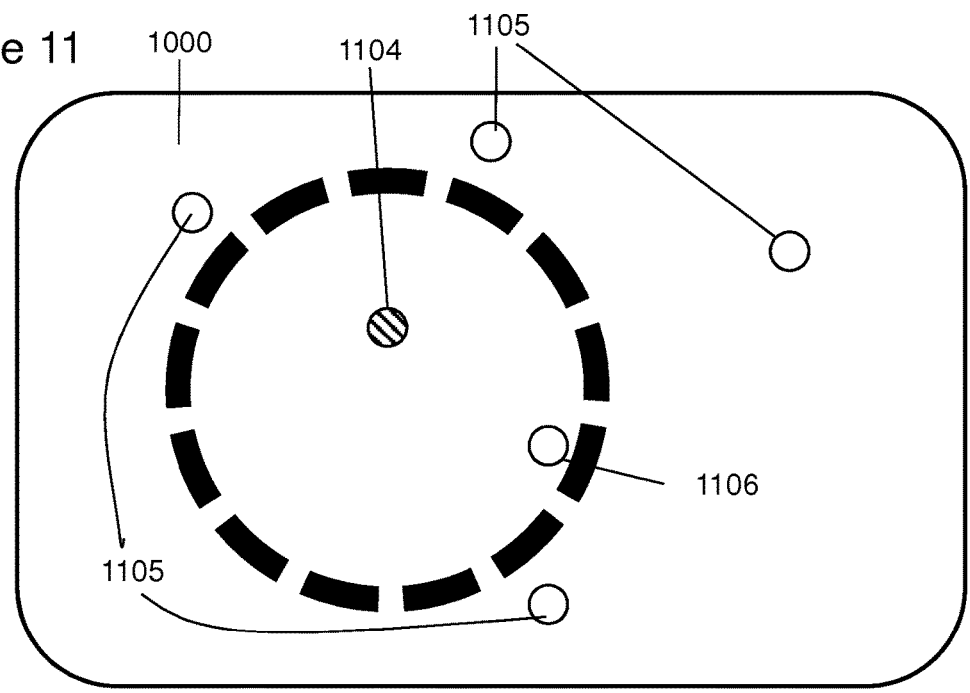
FIG. 11 illustrates an example of sources of audio in the room of FIG. 10.

Example FIG. 11 shows a simplified version of the room 1000 with the locations of various sound sources 1105, 1106 that contribute to the ambient audio and the location of the remote user 1104 who provides the voice audio.

Figure 12:
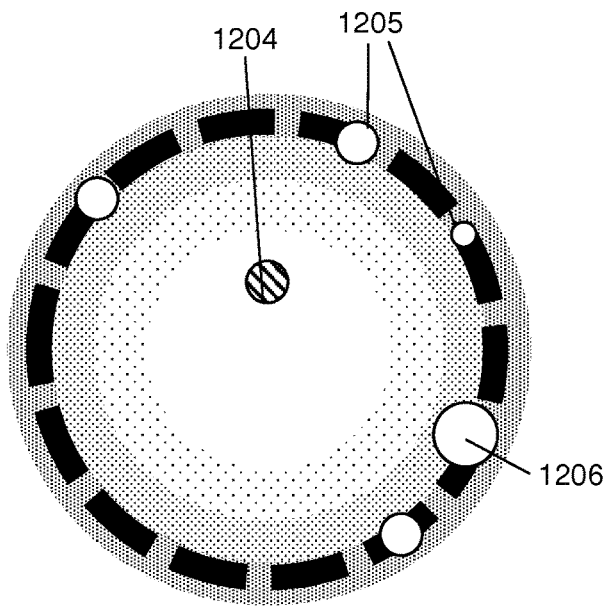
FIG. 12 illustrates the presentation of the audio captured from the room of FIGS. 10 and 11.

Example FIG. 12 shows the presentation of the voice audio (from representation 1204) and the ambient audio (from representations 1205, 1206) to the user 200 (not shown but may be present at any point in their room). The spatial arrangement of the ambient sound sources has been simplified at the point of presentation by the apparatus 100 but the ambient-perceived location is based on the directional information. In one or more examples, the spatial arrangement of the sound sources may be more faithfully reproduced. The shading of FIG. 12 represents that some of the ambient audio is rendered not from a specific direction but as diffuse sound without a clear location or direction of arrival. Thus, in one or more examples, the ambient audio may include diffuse audio not having directional information.

Figure 13:
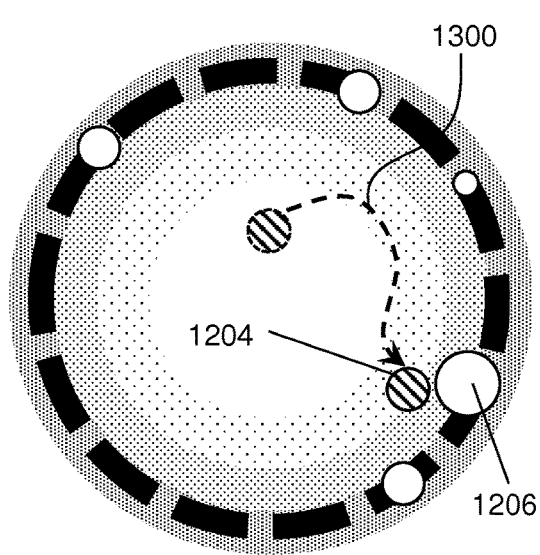
FIG. 13 illustrates an example of voice audio and ambient audio becoming co-located.

Example FIG. 13 shows the remote user 1104 having moved 1300 to near the sound source 1106. Accordingly, in the example presentation of FIG. 13, the representation of the voice-perceived location 1204 of the voice audio is co-located with the ambient-perceived location 1206 of the ambient audio.

Figure 14:
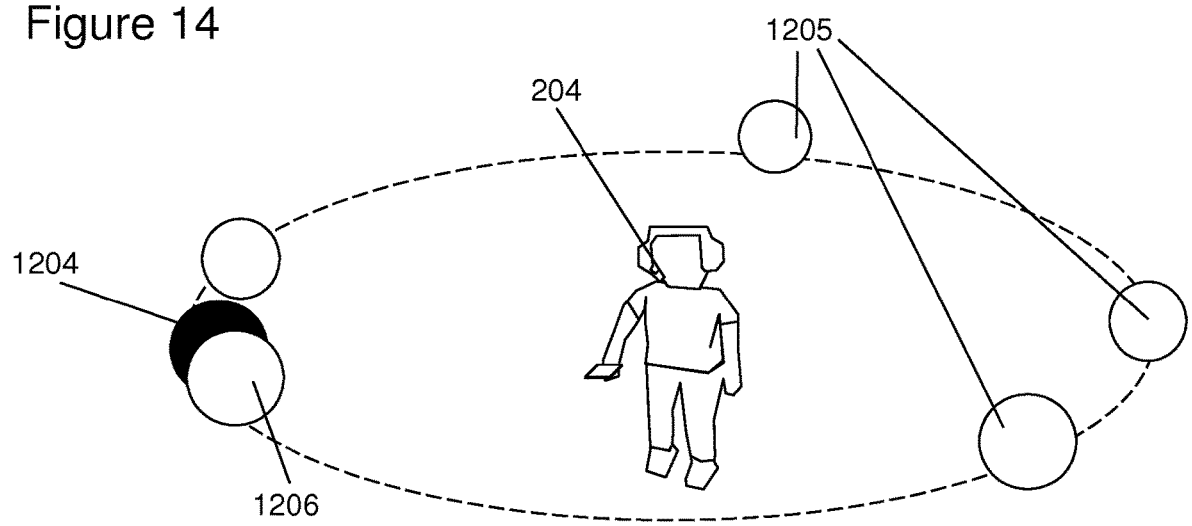
FIG. 14 illustrates a perspective view of FIG. 13.

Example FIG. 14 shows a perspective representation of what is shown in FIG. 13 and the same reference numerals have been used. The positioning of the representations 1204, 1205,1206 illustrate the positions from which the user 200 perceives the telecommunication audio content. However, for ease of explanation a view of the remote user 204 is provided.

The remote user 204 (or user 200 when providing an equivalent input) may be, at least temporarily, presented by their apparatus with a visual or audible representation of what is being presented to the user 200 in terms of the perceived positions of the voice and sound sources at least at the time they provide their user input so that they can hear the effect of the repositioning signalling that their user input is providing.

Figure 15:
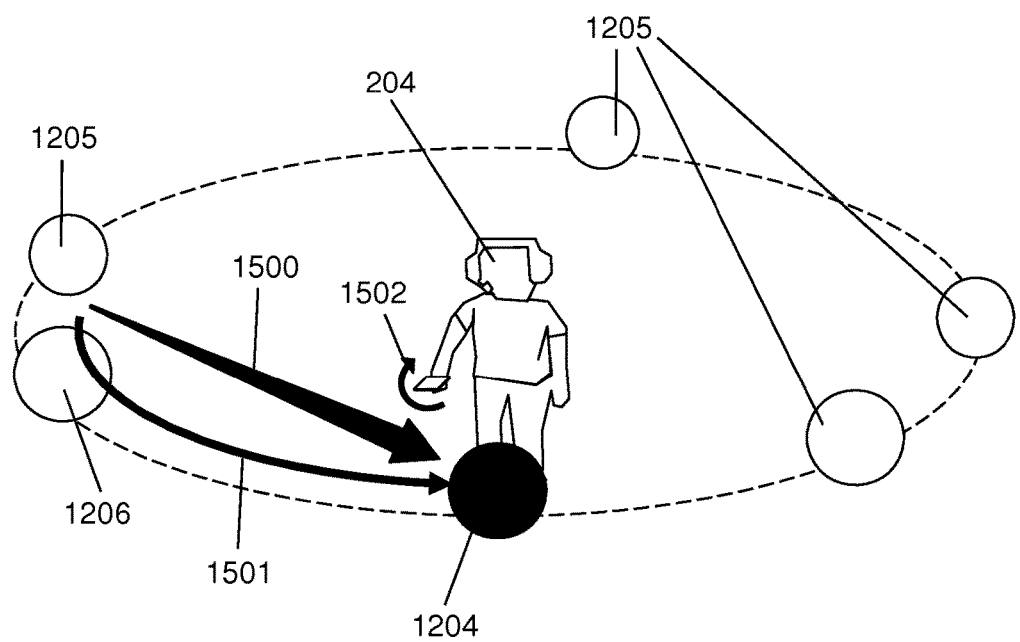
FIG. 15 illustrates the translation and rotation of the perceived location of the voice audio based on repositioning signalling generated by an example user input of rotation of a remote user's wrist.

Example FIG. 15 shows the repositioning of the voice-perceived direction by providing for a translation 1500 of the voice-perceived location 1204 based on the repositioning signalling. In one or more examples, the repositioning signalling may cause the repositioning by rotation 1501 as in the earlier examples.

Example FIG. 15 also shows the remote user 204 providing a rotation user input 1502 using an input device to provide the rotation 1501 for the presentation of audio to the user 200.

Figure 16:
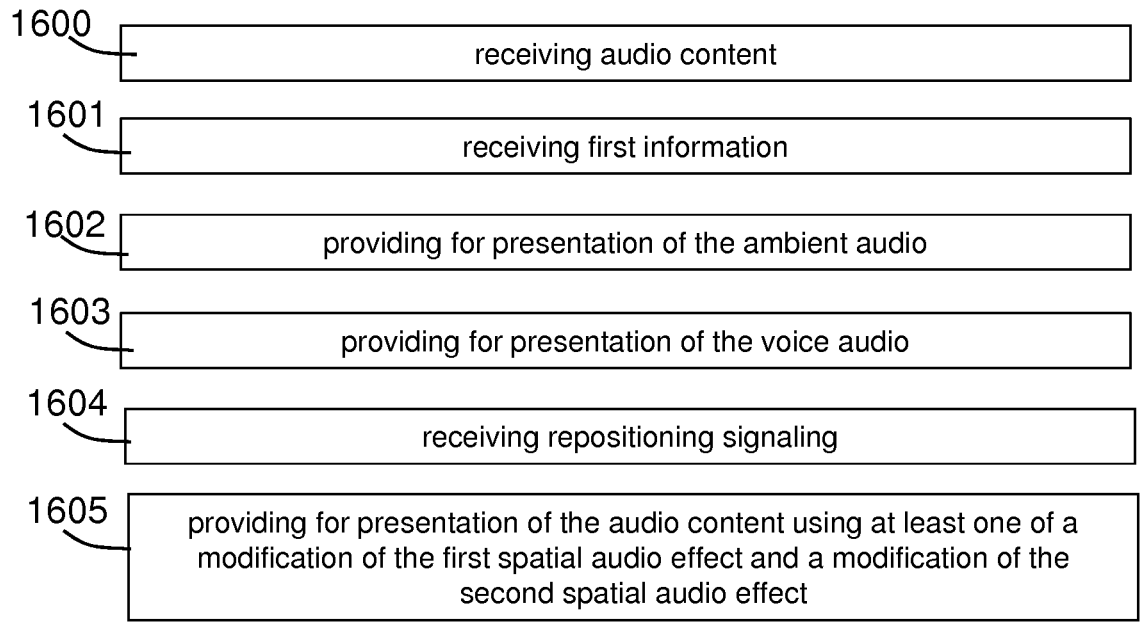
FIG. 16 shows a flowchart illustrating an example method.

FIG. 16 shows a flow diagram illustrating the steps of, receiving 1600 audio content comprising voice audio comprising a voice of a remote user of a remote user device and ambient audio comprising audio from at least one sound source other than the remote user, wherein the audio content is associated with directional information indicative of one of a direction and a position of the at least one sound source relative to a reference point and indicative of one of the direction and the position of the remote user relative to the reference point;
  receiving 1601 first information indicative of a reference location;
  providing for 1602 presentation of the ambient audio with a first spatial audio effect, based on the directional information, such that the audio of the at least one sound source is to be perceived as originating from an ambient-perceived direction relative to the reference location,
  providing for 1603 presentation of the voice audio with a second spatial audio effect, based on the directional information, such that the voice audio is to be perceived as originating from a voice-perceived direction relative to the reference location;
  receiving repositioning signalling 1604 from the remote user device, the repositioning signalling indicative of an input to change the presentation of the audio content received from the remote user device; and
  providing for presentation 1605 of the audio content using at least one of a modification of the first spatial audio effect to reposition the ambient-perceived direction relative to the reference location based on the repositioning signalling and a modification of the second spatial audio effect to reposition the voice-perceived direction relative to the reference location based on the repositioning signalling to increase the spatial separation between the voice-perceived direction and the ambient-perceived direction.

Figure 17:
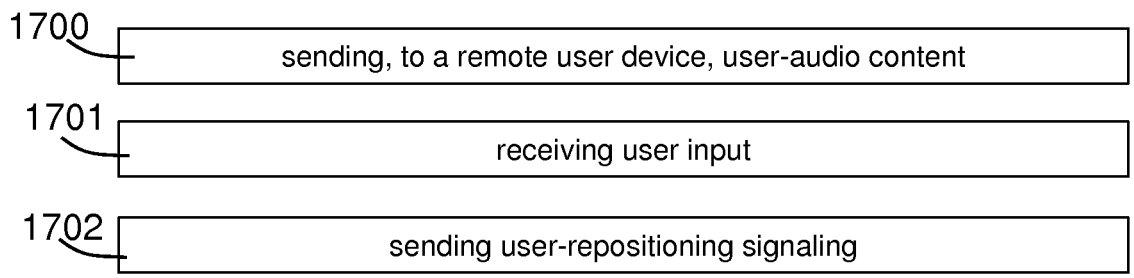
FIG. 17 shows a flowchart illustrating an example method.

FIG. 17 shows a flow diagram illustrating the steps of, sending 1700, to a remote user device, user-audio content for presentation by the remote user device, the user-audio content comprising user-voice audio comprising audio of a voice of a user, and user-ambient audio comprising audio from at least one sound source other than the user, wherein the user-audio content includes directional information indicative of the direction towards or the position of the at least one sound source relative to a user-reference point and the user relative to the user-reference point;
  receiving 1701 user input; and
  sending 1702 user-repositioning signalling determined from said user input, to the remote user device, the user-positioning signalling indicative that one of the user-voice audio and user-ambient-audio should be presented by the remote user device to be perceived from a direction based on the user-repositioning signalling wherein the other of the user-voice audio and user-ambient-audio should be presented based on the directional information of the user-audio content.

Figure 18:
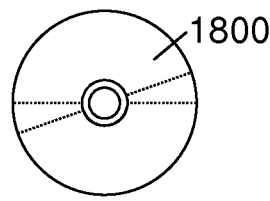
FIG. 18 shows a computer readable medium.

FIG. 18 illustrates schematically a computer/processor readable medium 1800 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising
at least one processor; and
at least one non-transitory memory including computer program code;
the at least one non-transitory memory and the computer program code configured to, with the at least one processor, cause the apparatus at least to perform:
receive audio content comprising:
voice audio comprising a voice of a remote user of a remote user device, and
ambient audio comprising audio from at least one sound source other than the remote user,
wherein the audio content is associated with directional information indicative of one of: a direction or a position of the at least one sound source relative to a reference point in a space in which the remote user device is located, and indicative of one of: a direction or a position of the remote user relative to the reference point in the space in which the remote user device is located;
receive first information indicative of a reference location;
provide for presentation of the ambient audio with a first spatial audio effect, based on the directional information, such that the audio of the at least one sound source is configured to be perceived as originating from an ambient-perceived direction relative to the reference location;
provide for presentation of the voice audio with a second spatial audio effect, based on the directional information, such that the voice audio is configured to be perceived as originating from a voice-perceived direction relative to the reference location;
receive repositioning signalling from the remote user device, the repositioning signalling indicative of an input to change a presentation of the audio content received from the remote user device independent of a current direction or a current position, defined in the directional information, of the remote user in the space in which the remote user device is located, and independent of a current direction or a current position, defined in the directional information, of the at least one sound source in the space in which the remote user device is located; and
provide for presentation of the audio content using at least one of:
a modification of the first spatial audio effect configured to reposition the ambient-perceived direction relative to the reference location based on the repositioning signalling, or
a modification of the second spatial audio effect configured to reposition the voice-perceived direction relative to the reference location based on the repositioning signalling
to increase a spatial separation between the voice-perceived direction and the ambient-perceived direction.

2. The apparatus of claim 1, wherein the repositioning signalling is indicative of where to reposition the at least one of the ambient-perceived direction or the voice-perceived direction and
wherein the at least one non-transitory memory and the computer program code are configured to, with the at least one processor, cause the apparatus to
provide for presentation of the audio content with the at least one of the modification of the first spatial audio effect for the ambient audio or the modification of the second spatial audio effect for the voice audio so that at least one of said ambient audio or said voice audio is configured to be perceived from a new direction indicated with the repositioning signalling.

3. The apparatus of claim 1, wherein the at least one non-transitory memory and the computer program code are configured to, with the at least one processor, cause the apparatus to perform:
receive user input indicative of repositioning of a perceived location of the presented audio content; and
present the audio content with one of modification of the first spatial audio effect configured to reposition the ambient-perceived direction as indicated with the user input, or modification of the second spatial audio effect configured to reposition the voice-perceived direction as indicated with the user input.

4. The apparatus of claim 1, wherein the at least one non-transitory memory and the computer program code are configured to, with the at least one processor, cause the apparatus to perform:
send, to the remote user device:
user-audio content for presentation to the remote user, the user-audio content comprising:
user-voice audio comprising audio determined to be generated based, at least partially, on a voice of a user, and
user-ambient audio comprising audio from at least one user sound source other than the user,
wherein the user-audio content includes user directional information indicative of one of: a direction towards or position of the at least one user sound source relative to a user-reference point, and indicative of one of: a direction towards or position of the user relative to the user-reference point, and
user-repositioning signalling instructing the remote user device to present one of the user-voice audio or the user-ambient audio such that it is configured to be perceived from a direction indicated at least in part with the user-repositioning signalling, wherein the other of the user-voice audio or the user-ambient audio is configured for presentation as indicated with the user directional information of the user-audio content.

5. The apparatus of claim 4, wherein the at least one non-transitory memory and the computer program code are configured to, with the at least one processor, cause the apparatus to perform:
receive a predetermined type of user input; and
send said user-repositioning signalling in response to the predetermined type of user input being received at a time it is determined that the user is talking; and
provide for presentation of the audio content with at least one of
the modification of the first spatial audio effect configured to reposition the ambient-perceived direction, or
the modification of the second spatial audio effect configured to reposition the voice-perceived direction
in response to said predetermined type of user input being received at the time it is determined that the remote user is talking.

6. The apparatus of claim 1, wherein said repositioning signalling is based on user input of the remote user.

7. The apparatus of claim 1, wherein one of the modification of the first spatial audio effect configured to reposition the ambient-perceived direction based on the repositioning signalling, or the modification of the second spatial audio effect configured to reposition the voice-perceived direction based on the repositioning signalling comprises a rotation, about the reference location, of said one of the ambient-perceived direction or the voice-perceived direction.

8. The apparatus of claim 7, wherein the directional information of the audio content is indicative of: the direction towards the at least one sound source, and the direction towards the remote user relative to the remote user device, and
the presentation of the ambient audio with the first spatial audio effect comprises presentation of the ambient audio as spatial audio to be perceived, from the reference location, as originating from the ambient-perceived direction that is based on the direction towards the at least one sound source relative to the remote user device defined in the directional information, and
the presentation of the voice audio with the second spatial audio effect comprises presentation of the voice audio as spatial audio to be perceived, from the reference location, as originating from the voice-perceived direction that is based on the direction towards the remote user relative to the remote user device defined in the directional information,
wherein the reference location comprises a location in a user space, wherein the user space is at least partially different from the space in which the remote user device is located.

9. The apparatus of claim 1, wherein
said ambient-perceived direction is a direction from an ambient-perceived location to the reference location based on the position of the at least one sound source defined in the directional information, the ambient-perceived location comprising a location used with the first spatial audio effect for presentation of the ambient audio such that a user perceives the ambient audio as originating from the ambient-perceived location; and
said voice-perceived direction is a direction from a voice-perceived location to the reference location based on the position of the remote user defined in the directional information, the voice-perceived location comprising a location used with the second spatial audio effect for presentation of the voice audio such that the user perceives the voice audio as originating from the voice-perceived location; and
wherein said at least one of the modification of the first spatial audio effect or the modification of the second spatial audio effect comprises repositioning a corresponding one of the ambient-perceived direction and/or the voice-perceived direction via a translation of a respective one of said ambient-perceived location and/or said voice-perceived location as indicated in the repositioning signaling.

10. The apparatus of claim 1, wherein
said ambient-perceived direction comprises an ambient-perceived location indicated in the directional information and comprises a location used with the first spatial audio effect to present the ambient audio to be perceived as originating from the ambient-perceived location, such that an arrangement of the at least one sound source in the space in which the remote user device is located is recreated in a space in which a user is located, and
said voice-perceived direction comprises a voice-perceived location indicated in the directional information and comprises a location used with the second spatial audio effect to present the voice audio to be perceived as originating from the voice-perceived location, such that an arrangement of the remote user in the space in which the remote user device is located is recreated in the space in which the user is located.

11. An apparatus comprising
at least one processor; and
at least one non-transitory memory including computer program code;
the at least one non-transitory memory and the computer program code configured to, with the at least one processor, cause the apparatus at least to perform:
send, to a remote user device, user-audio content for presentation with the remote user device, the user-audio content comprising:
user-voice audio comprising audio of a voice of a user, and
user-ambient audio comprising audio from at least one sound source other than the user,
wherein the user-audio content includes directional information indicative of a direction towards or a position of the at least one sound source relative to a user-reference point, and a direction towards or a position of the user relative to the user-reference point;
receive user input; and
send user-repositioning signalling determined from said user input, to the remote user device, the user-repositioning signalling indicative that one of the user-voice audio or the user-ambient audio should be presented with the remote user device so as to be configured to be perceived from a direction based on the user-repositioning signalling, wherein the other of the user-voice audio or the user-ambient audio should be presented based on the directional information of the user-audio content.

12. An apparatus according to claim 11, wherein said sending of the user-repositioning signaling is provided based on said user input being received at a time it is determined that the user is talking.

13. A method comprising:
receiving audio content comprising:
voice audio comprising a voice of a remote user of a remote user device, and
ambient audio comprising audio from at least one sound source other than the remote user,
wherein the audio content is associated with directional information indicative of one of: a direction or a position of the at least one sound source relative to a reference point in a space in which the remote user device is located, and indicative of one of: a direction or a position of the remote user relative to the reference point in the space in which the remote user device is located;
receiving first information indicative of a reference location;
providing for presentation of the ambient audio with a first spatial audio effect, based on the directional information, such that the audio of the at least one sound source is configured to be perceived as originating from an ambient-perceived direction relative to the reference location;
providing for presentation of the voice audio with a second spatial audio effect, based on the directional information, such that the voice audio is configured to be perceived as originating from a voice-perceived direction relative to the reference location;
receiving repositioning signalling from the remote user device, the repositioning signalling indicative of an input to change a presentation of the audio content received from the remote user device independent of a current direction or a current position, defined in the directional information, of the remote user in the space in which the remote user device is located, and independent of a current direction or a current position, defined in the directional information, of the at least one sound source in the space in which the remote user device is located; and
providing for presentation of the audio content using at least one of:
a modification of the first spatial audio effect configured to reposition the ambient-perceived direction relative to the reference location based on the repositioning signalling, or
a modification of the second spatial audio effect configured to reposition the voice-perceived direction relative to the reference location based on the repositioning signalling
to increase a spatial separation between the voice-perceived direction and the ambient-perceived direction.

14. The method of claim 13, wherein the repositioning signalling is indicative of where to reposition the at least one of the ambient-perceived direction or the voice-perceived direction and the method further comprising
providing for presentation of the audio content with the at least one of the modification of the first spatial audio effect for the ambient audio or the modification of the second spatial audio effect for the voice audio so that at least one of said ambient audio or said voice audio is configured to be perceived from a new direction indicated with the repositioning signalling.

15. The method of claim 13, further comprising:
receiving user input indicative of repositioning of a perceived location of the presented audio content; and
presenting the audio content with one of modification of the first spatial audio effect configured to reposition the ambient-perceived direction as indicated with the user input, or modification of the second spatial audio effect configured to reposition the voice-perceived direction as indicated with the user input.

16. The method of claim 13, further comprising:
sending, to the remote user device:
user-audio content for presentation to the remote user, the user-audio content comprising:
user-voice audio comprising audio determined to be generated based, at least partially, on a voice of a user, and
user-ambient audio comprising audio from at least one user sound source other than the user,
wherein the user-audio content includes user directional information indicative of one of: a direction towards or position of the at least one user sound source relative to a user-reference point, and indicative of one of: a direction towards or position of the user relative to the user-reference point, and
user-repositioning signalling instructing the remote user device to present one of the user-voice audio or the user-ambient audio such that it is configured to be perceived from a direction indicated at least in part with the user-repositioning signalling wherein the other of the user-voice audio or the user-ambient audio is configured for presentation as indicated with the user directional information of the user-audio content.

17. The method of claim 16, further comprising:

receiving a predetermined type of user input; and sending said user-repositioning signalling in response to the predetermined type of user input being received at a time it is determined that the user is talking; and providing for presentation of the audio content with at least one of the modification of the first spatial audio effect configured to reposition the ambient-perceived direction, or the modification of the second spatial audio effect configured to reposition the voice-perceived direction in response to said predetermined type of user input being received at the time it is determined that the remote user is talking.

18. The method of claim 13, wherein said repositioning signalling is based on user input of the remote user.

19. The method of claim 13, wherein one of the modification of the first spatial audio effect configured to reposition the ambient-perceived direction based on the repositioning signalling, or the modification of the second spatial audio effect configured to reposition the voice-perceived direction based on the repositioning signalling comprises a rotation, about the reference location, of said one of the ambient-perceived direction or the voice-perceived direction.

20. The method of claim 19, wherein the directional information of the audio content is indicative of the direction towards the at least one sound source and the direction towards the remote user relative to the remote user device, and the presentation of the ambient audio with the first spatial audio effect comprises presentation of the ambient audio as spatial audio to be perceived, from the reference location, as originating from the ambient-perceived direction that is based on the direction towards the at least one sound source relative to the remote user device defined in the directional information and the presentation of the voice audio with the second spatial audio effect comprises presentation of the voice audio as spatial audio to be perceived, from the reference location, as originating from the voice-perceived direction that is based on the direction towards the remote user relative to the remote user device defined in the directional information.

* * * * *